July 31, 1973    J. P. SHOFFNER    3,749,621
SECURING AND/OR FORMING OF COVERINGS AND THE LIKE OF
TETRAFLUORINATED ETHYLENE AND FLUORINATED
ETHYLENE POLYMERS
Filed June 9, 1971    3 Sheets-Sheet 1

FEP TUBING

RADIALLY EXPANDED, HEAT SHRINKABLE SLEEVE

CONCENTRATED HEATING AT INTERFACE

HEAT-SHRUNK MELT-BONDED FEP COVER

July 31, 1973   J. P. SHOFFNER   3,749,621
SECURING AND/OR FORMING OF COVERINGS AND THE LIKE OF
TETRAFLUORINATED ETHYLENE AND FLUORINATED
ETHYLENE POLYMERS
Filed June 9, 1971   3 Sheets-Sheet 2

United States Patent Office 3,749,621
Patented July 31, 1973

3,749,621
SECURING AND/OR FORMING OF COVERINGS AND THE LIKE OF TETRAFLUORINATED ETHYLENE AND FLUORINATED ETHYLENE POLYMERS
James P. Shoffner, Wilmington, Del., assignors to Fluorodynamics, Inc., Newark, Del.
Continuation-in-part of application Ser. No. 647,477, June 20, 1967. This application June 9, 1971, Ser. No. 151,299
Int. Cl. B29c 27/04; C09j 7/00
U.S. Cl. 156—86
10 Claims

ABSTRACT OF THE DISCLOSURE

The invention is directed to the concept of securing and/or forming of coverings and the like, of fluorinated ethylene polymer (FEP) materials, which makes advantageous use of the dimensional change occurring when the material, or controlled portions thereof, are heated to melting temperatures. Typically, the invention is most useful in applications in which the thickness of the cover material is small in relation to the dimensions of the covered part. In one form of the invention, bonded roll coverings are formed by bringing to fusion temperature the bonding surface region only of a heat-shrinkable FEP tube. In another form of the invention, a covering of tetrafluorinated ethylene (TFE) is bonded to a process roller by using an intermediate bonding film of fluorinated ethylene polymer. The TFE covering maintains the FEP bonding layer under pressure, in a concentration of heat energy at the interface of the FEP layer of the metal process roller and serves to melt the FEP and effect a bond thereof to the TFE and to the roller surface. The invention utilizes a concentration of heat energy at the interface of an FEP cover-element, combined with a thermally derived or enhanced interface pressure, to achieve the desired effect.

This application is a continuation-in-part of application Ser. No. 647,477, filed June 20, 1967, now abandoned.

SUMMARY OF THE INVENTION

The use of FEP resins having certain desirable chemical and physical properties, as a covering material for various elements of all sizes and shapes, is well known. Among the most important properties of these resins, of which Du Pont's Teflon FEP is typical, are chemical inertness, freedom from adhesion to other substances, and resistance to corrosion. Among the more common structures which have been protected or covered by FEP resins are process rollers. These and other elements typically have been covered using heat-shrunk thermoplastic sleeves for use in relatively low temperature environments, and using adhesively attached sleeves or sleeves which have been secured by both heat-shrinking and adhesive for use in relatively higher temperature environments. While these techniques have proved satisfactory for many applications, they have had certain shortcomings when the covered element is to be employed in high temperature environments (e.g., around 300° F. for FEP).

When an adhesively bonded, covered roll, for example, is subjected to high temperature environments, the differential rates of thermal expansion of the core and cover may cause undesirable loosening of adhesively bonded areas, wrinkling, and other surface smoothness depreciation. Moreover, at these high temperature conditions, the adhesives used to bond the core and sleeve may be subject to outgassing; that is, volatiles in the adhesive may be liberated at high temperatures and deleteriously would tend to form bubbles at the interface between the core and sleeve.

Regardless of the temperature of the surface conditions, the adhesive of an adhesively bonded cover may be subject to attack, due to the permeability of the fluorocarbon plastic sleeve, when the element is employed in a highly corrosive atmosphere. Further, when an adhesive layer is interposed between the core and the covering sleeve, there may be an undesired increase in the rate of heat transfer between the sleeve and core.

One of the important aspects of the present invention is the provision of new and improved methods for melt bonding fluorocarbon thermoplastic materials, such as Teflon FEP resins, to substrates, to provide fluorocarbon plastic covered elements having improved characteristics in comparison with similarly covered elements which have heretofore been available. The improved bonding of a heat shrinkable tubular cylindrical sleeve of Teflon FEP to a roller element, for example, may be effected without the use of an intermediate adhesive layer, in accordance with the principles of the invention, by locally heating the internal surfaces only of the covering sleeve to the melting point and bonding the same, under pressure, to the external roller surfaces. As one aspect of the invention, the localized melting is effected by highly concentrating heating energy at the interface of the roller and sleeve while subjecting the sleeve to axial tension. The concentrated heat advantageously is derived from a high frequency electrical energy source, which provides heat for melting the inner surfaces of the sleeve and also provides sufficient heating of the remainder of the sleeve to cause it to shrink very tightly about the roller. A superior bond is thus established at the interface without the interposition of an extraneous adhesive.

As will be appreciated, by melt bonding the cover to the substrate in accordance with the principles of the invention, the finished product will have superior stability at extremely high temperatures and will be free of the effects of adhesive outgassing, adhesive degradation, and bubble formation that may be encountered when adhesive bonding is employed.

In desired cases, where the nature of the substrate requires, as because of its inability to withstand exposure to the melt temperature of FEP, an inner layer of lower melting point material may be provided, which may be prefused or fused in situ. For covering rollers, for example, concentric, heat-shrinkable sleeves could be employed; the inner sleeve might be of a polyvinyl chloride resin for example.

In certain cases, a suitable adhesive might be employed, which could be dielectrically activated. Thus, for covering a non-magnetic process roller, for example, an expanded FEP sleeve may be coated interiorly with a dielectrically activated adhesive. After heat-shrinking of the sleeve tightly onto the process roller, the adhesive may be activated to perfect the bond.

As one of its more specific aspects, the invention is directed to the use of a specific material, currently made available under the Du Pont trade designation Teflon FEP 160, for forming melt bonded FEP covers for high temperature service. Because of the material's rapid degradation at melt temperatures, special techniques of the invention can be employed to advantage for melt bonding.

For some end applications, the FEP resin may be applied in the form of a strip, sheet, tape or the like, and heated to fusion between parts which, in effect, form a mold. The outer part of the mold most advantageously is a material, such as Du Pont's Teflon TFE, which is relatively invisible to high frequency heating energy and which can contain the FEP at its melt temperature. The FEP, at melt temperature, thermally expands into precision conformity with the confining elements, but readily releases from the TFE confining material, upon subsequent cooling.

In accordance with another aspect of the invention, roller coverings of tetrafluorinated ethylene (TFE) are bonded to metal process rollers with high effectiveness by utilizing an intermediate, thin bonding film of FEP. In accordance with this new technique, the metal processing roller is first covered with a thin bonding film of FEP, and then has applied over it, a heat-expanded tubular roll covering of TFE. Upon cooling down, the TFE outer covering shrinks tightly onto the process roll and places the intervening FEP layer under significant radial pressure. Subsequently, the FEP layer is selectively melted by the localized application of concentrated high frequency energy. The FEP thus is melt bonded to the process roller and to the TFE covering. The high pressures necessary to effect bonding of the FEP to the TFE are maintained, because the TFE is not heated sufficiently to cause significant expansion.

For a more complete understanding of the subject invention, reference should be made to the following detailed description taken in conjunction with the aaccompanying drawings.

DESCRIPTION OF PREFERRED EMBODIMENTS OF THE INVENTION

Figure 1:
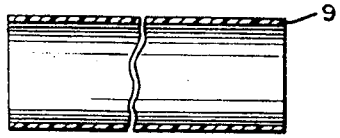
FIG. 1 is a cross-sectional view of a length of fluorocarbon thermoplastic tubing employed in the practice of the invention.

In a first preferred embodiment of the invention, the core element to be covered is typically a metallic cylindrical roller 10 (FIG. 3), and the heat-sealable thermoplastic cover is an extruded fluorocarbon thermoplastic tube 9 (FIG. 1) of smaller initial diameter than the roller. Advantageously, the thermoplastic is one of the Teflon FEP resins manufactured by E. I. du Pont de Nemours & Co., Inc., and, most particularly, advantageously a resin made available as of the filing date hereof under Du Pont's trade designation Teflon T–160 FEP-fluorocarbon resin. The T–160 resin is formulated specifically for applications where chemical resistance is a factor. It has a significantly higher melt viscosity than other Du Pont Teflon resins and has superior stress crack resistance, which is desired for the high stress conditions often encountered in high temperature service. Although the T–160 resin is adapted for continuous service at temperatures as high as 400° F., it will undergo rapid degradation at temperatures of around 700° F. and so must not be exposed to such temperatures for any significant period of time.

Figure 2:
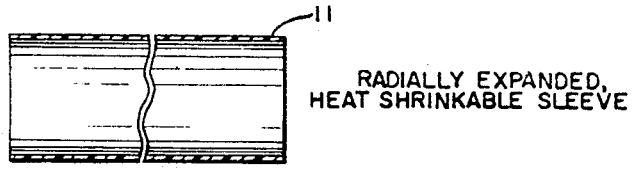
FIG. 2 is a cross-sectional view of the tubing of FIG. 1 which has been expanded to make it heat-shrinkable.

To facilitate the initial assembly of the core element and, more importantly, to impart radial heat-shrinkability to the covering material, the thermoplastic tubing 9 from which the covering is to be formed is radially expanded into a sleeve 11 (FIG. 2) having a larger internal diameter than the outer diameter of the core 10 to be covered.

Figure 3:
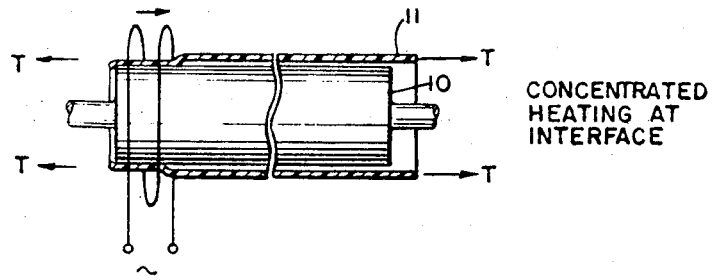
FIG. 3 is an exaggerated schematic, cross-sectional representation of an assembly of a roller and the sleeve of FIG. 2 being subjected to concentrated high frequency energy at the roller-sleeve interface, in accordance with the invention.

Referring now to FIG. 3 of the drawings, the first illustrated method of the invention may be practiced by initially applying the expanded, heat-shrinkable sleeve 11, of FEP thermoplastic resin, over a core roller 10. As an important aspect of the invention, the heat-sealable covering sleeve 11 must possess sufficient heat-shrinkability to tightly grip the core 10 when subsequently subjected to heat treatment.

Figure 4:
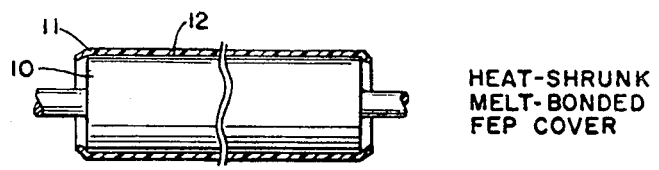
FIG. 4 is a cross-sectional representation of a roller having a heat-shrunk cover heat sealed thereto in accordance with the invention.

The assembled core and heat-shrinkable Teflon FEP sleeve are then permanently joined throughout their common interface, in accordance with the principles of the invention, applying high frequency heating techniques (induction heating, dielectric heating, laser heating, etc.) to develop highly concentrated heat energy at the interface 12 (FIG. 5) of the sleeve and core. The energy is provided by a high frequency generator 8 and is carefully controlled and concentrated in order to melt only the innermost surface portions 13 of the sleeve. Some of the energy provided for the concentrated, localized heating will be transferred to the remaining outer portions 14 of the sleeve and, as an important aspect of the invention, will be sufficient to provide the requisite heat to shrink the sleeve 11, as a whole, tightly against the outer surfaces 15 of the core 10 (FIG. 4).

Figure 5:
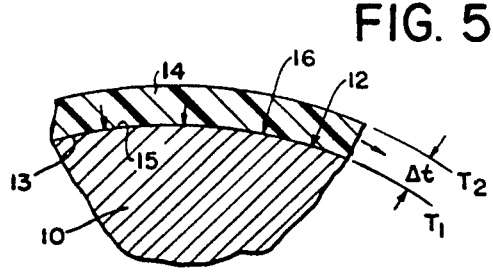
FIG. 5 is an enlarged, fregmentaary, cross-sectional representation of a cover and roller assembly during bond formation.

Thus it will be understood, as indicated in FIG. 5, that the temperature T1 at the inner sleeve face 12 will be equal to or be greater than the melting point of the selected FEP resin, while the temperature T2 of the remainder of the sleeve will be less than the melting point. In other words, the outer portions 14 of the sleeve are sufficiently heated for shrinking but are insufficiently heated for melting.

Cooling of the melted plastic at the interface will establish an extremely durable and very strong bond which is stable at highly elevated temperatures (250° F.–550° F.) in accordance with the inventive principles. Although a complete explanation for the efficacy of the melt bonds produced in accordance with the inventive principles is not yet available, it is particularly advantageous for the sleeve 11 to possess the property of heat shrinkability. It is not certain whether the desirable effect of the shrinking of the sleeve 11 during bonding is derived from the provision of adequate constricting pressure to perfect the bond, the compensation for thermal expansion, or possibly some combination of both. In any event, it has been established that the use of a heat-shrinkable cover is most advantageous for the installation of bonded sleeves and that the internal stresses created by the shrinking of the sleeve as a whole are sufficient to apply effective radial bonding pressure at the interface 12 between the core and the cover sleeve during bond formation (FIG. 5).

Along with the radial heat shrinkage and melt bonding of the sleeve, a predetermined axial tension advantageously is applied to the sleeve to assure that the finished product will be free of any wrinkles or other formations which might otherwise result from the effect of the radially inward shrinkage of the sleeve and/or from the thermal expansions and contractions of the material. In this respect, it is particularly desirable to have the sleeve shrunk and permanently melt bonded to the core while maintaining sufficient axial tension on the sleeve to at least fully compensate for the tendency of the sleeve to thermally elongate under service conditions. In other words, the sleeve is initially set under axial stress, and the tendency for the material to thermally elongate in service ideally would simply relieve the initial stress.

When the core 10 is made of glass, its outer surface 15 may tend to be etched in situ by fluorine released from the FEP resin during melting. The etched surface, of course, contributes to the strength of the resulting bond of the sleeve to the core.

In the practice of the invention, the wall thickness of the heat shrinkable FEP tubing is typically in the range of approximately .010 to .090 inch, in which cases the high frequency energy is applied for several seconds duration, typically at frequencies ranging from approximately 300,000 to 500,000 kHz. As will be understood, the specific optimum frequencies for a given processing operation will be a function of the materials to be processed and their dimensions, etc., but can be determined empirically without difficulty, to concentrate heat energy at the interface to be bonded in a way to effect interface bonding while maintaining the body of the FEP resin below its melt temperature.

While the use of high frequency energy usually is most effective for concentrated interface heating, for the purposes of the invention, it is conceivable that other heating techniques would be operative within the context of the invention. For example, it may be appropriate in certain instances to simultaneously heat the inside of the sleeve and cool the exterior thereof, in order to achieve a satisfactory melt bond without actually melting the exterior body of the covering material.

Figure 6:
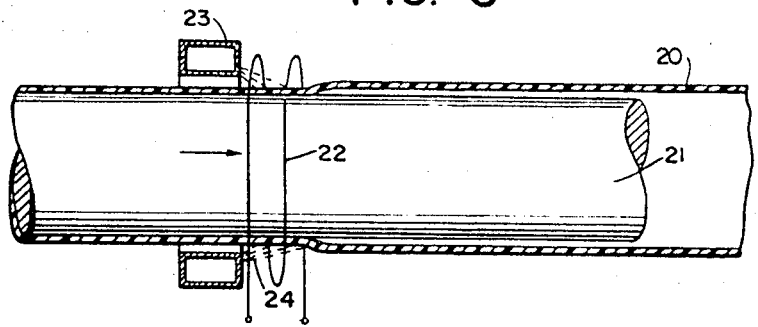
FIG. 6 is a fragmentary, cross-sectional view illustrating the melt bonding of high melt viscosity FEP resin tubing, under conditions to prevent heat degradation at the melt temperature.

Particularly when utilizing a material such as Du Pont's Teflon FEP T-160, care must be taken not to expose the resin to temperatures on the order of 700° F. to avoid thermal degradation. However, it may be desired at times to utilize bonding temperatures in the range of the degradation temperature. Thus, in accordance with one aspect of the invention, illustrated in FIG. 6, provision is made for heating a covering element 20, of a material such as Teflon T-160, at the bonding interface, while simultaneously chilling the outer surface. In the specific arrangement shown in FIG. 6, there is a core element 21, typically a processing roller, which is to be covered by a heat-shrinkable sleeve 20, utilizing an axially traversing induction coil 22. As the coil 22 progresses along the core 21, there is a concentration of heat energy at the outer surface of the core, which serves to shrink down the sleeve 20 and melt its inner surface to provide the desired melt bond.

Although the melt temperature of the T-160 resin is on the order of 500° F. to 530° F., it has been found that much superior bonding of the material to a steel core, for example, can be achieved if the material is heated up to around the 700° F. level, at which the material is subject to rapid degradation. Thus, in accordance with the invention, the speed of travel and concentration of heat energy of the coil 22 are calculated to raise the interface temperature of the sleeve 20 to around 700° F. or possibly slightly higher, in order to achieve a particularly effective interface bond. At the same time, means such as a manifold ring 23 is arranged to surround the sleeve 20 in the immediate region of the induction coil 22 and to direct low temperature cooling medium on the exterior of the sleeve immediately opposite the area of the melt bonding. Typically, $CO_2$ gas at evaporation temperatures may be directed on the tube in the melt area, as indicated at 24 in FIG. 6, to chill the exterior of the tube in the immediate region of the bonding. The heat transfer characteristics of the sleeve are such as to enable the simultaneous heating and chilling to occur, whereby an extremely efficient melt bond is obtained without overall degradation of the material.

For certain applications, it may be undesirable or impossible to subject the core or substrate to be covered to the temperatures necessary to effect melt bonding of the FEP resin. In such cases, it is advantageous to utilize a bonding intermediate having a lower melt temperature, which may be pre-fused to the FEP covering material (FIG. 7) or may initially be separate therefrom (FIG. 8). By way of typical example, a cylindrical core 30 of FIG. 7, of a material which it is not desired to heat to the melt temperature of FEP resin, has applied thereto a sleeve 31 of the FEP resin, to the interior surface of which has been fused a bonding sleeve 32, of a lower temperature thermoplastic material. Polyvinyl chloride, having a melt temperature of around 300° F., is a typical and advantageous material from which the bonding sleeve 32 may be formed.

Figure 7:
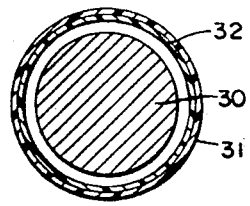
FIG. 7 is a cross-sectional representation showing an arrangement for melt bonding of a covering material to a core, utilizing a lower temperature bonding material pre-fused to the covering material.
Figure 8:
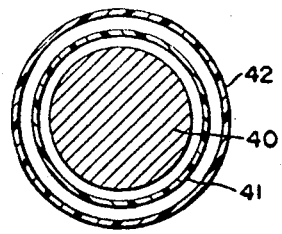
FIG. 8 is a cross-sectional view, similar to FIG. 7 and showing a process similar to that of FIG. 7, except that the bonding material is initially separate from the FEP cover material and becomes bonded thereto during installation.

In the arrangement of FIG. 7, the initially expanded and heat-shrinkable pre-fused laminate of FEP and PVC resin 31, 32, is heat shrunk and melt bonded to the core element 30, substantially in the manner heretofore described in connection with FIGS. 1–5, for example.

In the arrangement of FIG. 8, a core element 40 has applied thereover an inner sleeve 41 and an outer sleeve 42, which are initially separate. The outer sleeve may be formed of a material such as FEP resin, while the inner sleeve 41 is of a lower melting point thermoplastic material, such as polyvinyl chloride. In the installation procedure, the sleeves 41, 42 are separately applied over the core and are subjected to sufficient heat for heat shrinking into tight relation to the core and to concentrated heat at the outer surface of the core 40 to melt bond the sleeve 41 to both the core 40 and the sleeve 42.

Figure 9:
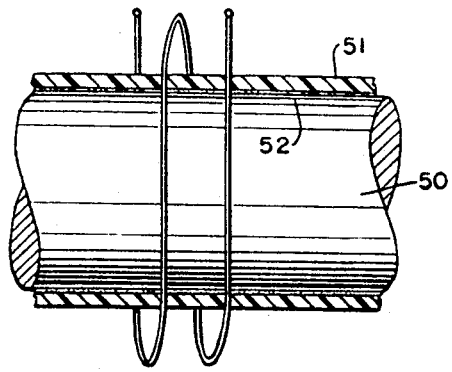
FIG. 9 is an enlarged longitudinal sectional view of a covered roll installation according to one aspect of the invention, in which a pre-shrunk FEP sleeve is bonded to a core by means of a dielectrically activated adhesive.

For certain installations, particularly where the nature of the core material does not readily admit of high frequency heating techniques, it may be desirable to employ an adhesive material which can be activated by high frequency energy. Thus, referring to FIG. 9, there is shown by way of example a non-magnetic core 50, which has applied thereto a sleeve 51, of a material such as FEP resin, which is heat-shrunk onto the core under non-bonding conditions (i.e., relatively low temperature). Previously coated on the inner surface of the sleeve 51 or, more probably, on the outer surface of the core 50, in an adhesive layer 52, which is specially formulated to respond to dielectric heating. Thus, after the sleeve 51 has been installed and tightly heat shrunk onto the core 50, the adhesive layer 52 is activated selectively to perfect the bond. This technique is particularly advantageous when an adhesive is required, in that it enables the sleeve 51 to be perfectly conditioned in terms of freedom from wrinkles, etc., prior to activation of the adhesives, and, in addition, permits the adhesive to be activated without excessive distortions from thermal elongation and contraction of the sleeve.

Figure 10:
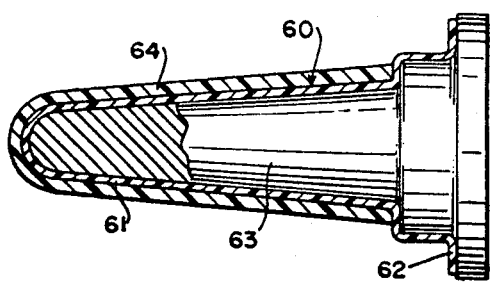
FIG. 10 is a cross-sectional representation illustrating the forming of an FEP covering element, with or without bonding thereof to a core, under condtions of melting of the FEP resin and thermal expansion thereof into intimate conformity with the confining elements.

In an advantageous form of the invention illustrated in FIG. 10, special parts of FEP resin, such as roll coverings, thermowell covers, etc., may be formed in a way to take advantage of the thermally activated dimensional changes of the FEP resin. In the specific illustration of FIG. 10, for example a thermowell cover 60, comprising a well body 61 and a flange 62 may be thermally formed between a suitably shaped mandrel 63 and a confining mold 64, formed of a material such as a tetrafluoroethylene resin (TFE). Du Pont's Teflon TFE resin is well suited for the purpose. In preparation for forming the part 60, the FEP resin may be applied to the mandrel 63 in the form of a tape or strip material, for example, which is wound around the mandrel in spiral fashion. Thereafter, the cup-like confining mold 64 of TFE resin is applied over the wrapped mandrel, which is then subjected to heating.

Where the mandrel 63 is a thermowell, for example, it may be desired that the FEP cover 61 be melt bonded thereto, and this is achieved, while simultaneously molding the cover by suitable induction heating of the thermowell mandrel 63 in the manner above described. The TFE resin, forming the confining exterior mold 64, is invisible to the high frequency energy and so readily accommodates this form of heating.

Intimate conformity of the FEP resin to the mold cavity, accompanied by melt bonding to the mandrel 63, is assured by the expansion tendencies of the materials, when heated, which cause the melted FEP resin to be formed with precision. Teflon T–160 FEP resin may be particularly advantageous for this purpose, because of its significantly high melt viscosity.

In the illustration of FIG. 10, the thermowell mandrel 63 typically is of tapered configuration, which further facilitates proper compression of the melted resin within the mold, as well as subsequent release therefrom. In this respect, the TFE resin is admirably suited for confining the exterior of the melted FEP resin, in view of its being substantially invisible to the high frequency heating energy, having a higher melting point than the FEP resin and, of course, having particularly desirable release characteristics.

In some instances, it may be desirable to avoid bonding of the thermo-formed part 61 to the underlying mandrel 63, in which case the mandrel may be precoated with a suitable release agent.

For some applications of Teflon FEP sleeves to conductive metal roller surfaces, it may be preferable to effect an initial shrink-down of the sleeve prior to, and as a separate operation from, the bonding of the FEP to the metal roll. In such instances, the use of high frequency induction heating, advanced progressively along the roller length for bonding, is uniquely advantageous, because it enables the heat to be "focused" on a limited area. Since the entire roll is not heated, a large and highly effective heat sink is provided by the remainder of the roll body, enabling heat to be rapidly extracted from zones just passed by the heating coil. This is especially significant with a material such as Teflon FEP-160, for example, which thermally degrades quickly at melt temperatures. To additional advantage, the progressive advance of a narrow, focused, annular heating band along the length of the roll enables gas to escape in advance of the melting band of resin and largely prevents undesirable gas entrapments.

In the modified procedure referred to in the foregoing paragraph, it is typical, first, to shrink down the sleeve of Teflon FEP or other fluorocarbon, after which the sleeved process roll is wrapped with a material such as polyimide (e.g., "Kapton") film, reinforced silicone rubber, or a like material, which has the desired degree of surface smoothness and has desired high strength at elevated temperatures and low expansion characteristics. Polyimide film generally is preferred for non-repetitive operations. The over-wrap of polyimide, silicone rubber, etc., maintains the underlying fluorocarbon material under a desirably high degree of radial pressure to promote good bonding of the viscous resin to the roller surface.

In some instances, the foregoing procedure can be modified further by merely wrapping the process roll with a material such as Teflon FEP–160 in sheet or spiral wrapped form, with the edges butted, without the fluorocarbon material being either in tubular form or in a heat-shrinkable form. The wrapping of FEP is followed by an over-wrap of polyimide or silicone rubber, and possibly even a further over-wrap of fiber glass cloth or other material which is not affected by heat by fluorocarbon fusion temperatures. When this is followed by the progressive application along the roll length of focused, high frequency induction heating energy, the fluorocarbon film is locally brought to melt temperature. Because of the high thermal expansion characteristics of the FEP fluorocarbon, there is a tendency for it to increase in volume and it thus becomes placed under substantial pressure. This not only promotes a highly effective bond of the FEP to the metal surface, but desirably molds the outer surface of the FEP fluorocarbon to provide a continuous, tubular roll covering.

According to another aspect of the invention, a novel and advantageous method is provided for bonding roller coverings of tetrafluoroethylene (TFE) or compounds of TFE with materials such as glass fiber, graphite, etc., to process rollers. The TFE surface covering is preferred for some service applications, because of its exceptionally good release characteristics and because of its ability to withstand higher service temperatures. However, TFE is not a thermoplastic material and is generally difficult and expensive to mount in bonded relation to a process roller. In accordance with the invention, the TFE roller covering is bonded to a metal process roller by means of an intermediate bonding layer of FEP, such as Du Pont's Teflon T–160.

As is evident from the foregoing description, the exceptional release characteristics of TFE introduce difficulties in effecting a bond between the TFE and the FEP, even under melt conditions for the FEP. However, in the procedure of our invention, an effective bond is achieved by causing the FEP to be under significant radical confining pressure during the bonding procedure and while the FEP is in a melt condition. This is accomplished, not by causing a heat-shrinking of the TFE, which is not practical, but by initially causing the TFE tubular covering to be applied over the process roller in a heat-expanded condition, after which it contracts upon cooling and places an intermediate film of FEP under significant pressure. The bonding operation is then carried out in such a way as to avoid significantly heating the TFE to a point which would cause it to re-expand.

Figure 11:
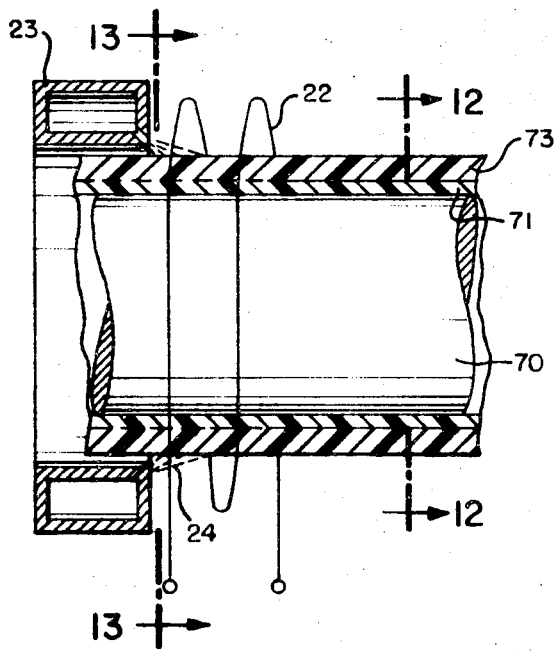
FIG. 11 is a fragmentary cross-sectionaal representation illustrating the forming of a TFE process roll covering, utilizing an intermediate FEP layer.
Figure 12:
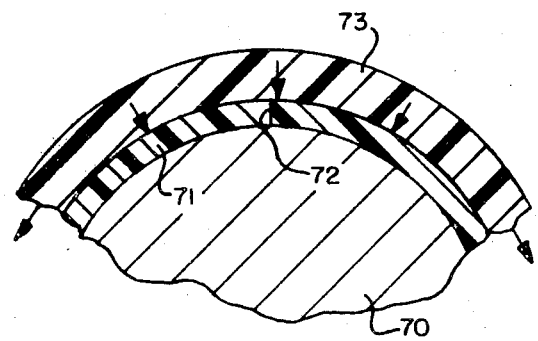
FIGS. 12 and 13 are enlarged cross-sectional views taken along lines 12—12 and 13—13, respectively, of FIG. 11.
Figure 13:
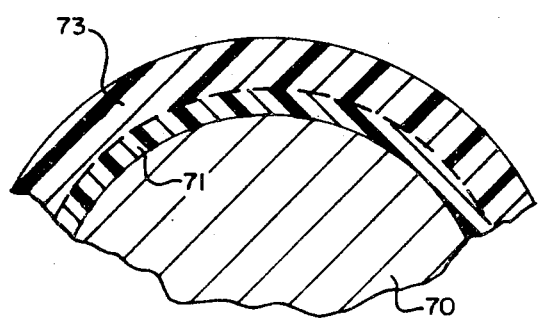

In the illustration of FIGS. 11–13, the reference numeral 70 designates a process roller, typically of steel, about which is wrapped a bonding film 71 of FEP material, typically Du Pont's Teflon T-160. The bonding film 71 may be quite thin, for example two (2) mils, and is applied over the entire surface of the roll which is to be covered. The end edges of the film may be abutted as at 72 (FIG. 12) or the film may be applied in tubular or spiral form.

A pre-formed tubular sleeve 73 of TFE, of a size and shape suitable for the purpose, is applied over the process roller 70 and the FEP bonding film 71. In accordance with the invention, the diameter of the TFE sleeve at room temperature is less than the diameter of the FEP covered process roller. By way of example, for a process roller of 5.000 inches in diameter, covered by a bonding film 71 of two (2) mils thickness, the room temperature inside diameter of the TFE sleeve typically might be 4.08–4.09 inches. The thickness of the sleeve 73 normally will be substantially greater than that of the bonding film 71.

Prior to application of the TFE sleeve to the covered process roller, the sleeve is heated to an elevated temperature, typically on the order of 720°–780° F., to cause the sleeve to expand radially and enabling it to be easily slipped over the FEP covered roller. Subsequently, when the TFE sleeve 73 cools to a lower temperature, it contracts radially and places the intermediate FEP bonding layer 71 under significant radial pressure.

In order to achieve an effective bond between the FEP and the roller surface, on the one hand, and the TFE sleeve, on the other, the FEP must be in a melt condition, the TFE surface must be in a gel condition, and the FEP must be contained under radial pressure. The minimum gel temperature for TFE temperature is on the order of around 620° F. and thus it is desirable and advantageous to effect bonding while the TFE sleeve is cooling down from its initial temperature of 720°–780° but prior to its reaching the lower limit of its gel temperature of around 620° F. This may be achieved to greatest advantage by traversing the process roll and its coverings with an energized conductor ring to impart a focused zone of high frequency induction heating.

The dimensional relationships of the TFE surfacing sleeve and the FEP bonding interlayer should be such that, at the gel temperature of the TFE, the TFE sleeve is able to impart a radial confining pressure to the FEP bonding layer. The heating of the bonding layer should be carried out in such a manner that the FEP is heated to at least 530°, and preferably substantially higher, but not higher than 720°.

In some instances, where the dimensional relationships do not reliably achieve the necessary level of confining pressure upon the FEP bonding layer, the entire structure of process roller, FEP bonding layer and TFE surface layer may be wrapped with dimensionally stable materials, such as glass fiber cloth, polyimide film, or the like. This limits the ability of the TFE to expand thermally and thus enables a higher degree of confining pressure to be exerted upon the FEP bonding layer as it attempts to expand thermally in reaching a melt condition.

The basic techniques of the invention make advantageous use of the thermal activation of Teflon FEP resins to effect bonding and/or forming of the resins. In one particularly significant form of the invention, a melt-bonded FEP roll covering or the like is provided by applying a moving concentrated cone of heat at the surface of the element to be covered, in a manner to radially shrink the covering sleeves and provide a localized melt bond at the interface. Substantial surface pressure is provided for, in some cases, by the heat shrinking of the covering element and in other cases by its physical confinement. This enables an excellent bond to be achieved with the core material, and also tends to compensate for the effects of thermal contraction and elongation. Other arrangements may be provided for applying bonding pressure and maintaining the covering film under taut conditions during the process of interface heating.

Concentrated and localized interface heating of the covering element and the core or other substrate most advantageously is achieved by induction or dielectric heating, and perhaps also with laser energy. Precise concentration and localization of the heating energy is important because the relative thickness of the FEP covering film is relatively small, and typically only a small fraction of the thickness of the core. For example, in covering a processing roller of around 5 inches in diameter, a film of about 20 mils thickness typically might be utilized. At one extreme, in the formation of a thermowell liner, as illustrated in FIG. 10, the overall thickness of the liner might be on the order of 100 mils, applied over a well having a diameter of about 300 mils; more typically, however, the film thickness is much lower in relation to the dimensions of the core.

FEP covered elements fabricated in accordance with the principles of the invention will have a better and longer service life in those high temperature and/or corrosive environments which would ordinarily tend to be destructive of or deleterious to many adhesive compositions of the type used heretofore. By melt bonding of a heat-shrinkable Teflon FEP sleeve to a core element, for example, the problems of outgassing, corrosive attack, release of volatiles, bubbling, uneven heat transfer, etc., which are associated with adhesives, are eliminated and a superior bond is produced.

The invention also provides a uniquely effective way of bonding surface coverings of TFE and TFE compounds to conductive process rollers by effecting concentrated, localized heating of an intermediate layer of FEP bonding material while maintaining the FEP under radial compression through thermal (cooling) contraction of the TFE.

As will be understood, non-tubular sheets of FEP also may be heat sealed to underlying substrates by locally heating the interface through high frequency techniques while simultaneously applying sealing pressure as by platen means which are transparent to the transmission of the heating energy.

It should be understood that the specific method and means herein illustrated and described are intended to be representative only, as certain changes may be made therein without departing from the clear teachings of the disclosure. In some instances, for example, the techniques described for mounting TFE sleeves may be employed for installing sleeves of polyimide materials which bond readily to the FEP bonding sleeve. Likewise, other fluorinated polymers, such as "Kynar," manufactured by Pennsalt Chemical Company, may be used as bonding materials.

I claim:
1. The method of applying a covering to a heat conductive core member of predetermined cross-section dimensions, comprising
   (a) supplying a hollow heat-shrinkable, heat-sealable tubular sleeve of a thermoplastic material having heat shrinking properties characteristic of fluorinated ethylene polymer resin and having internal cross section dimensions greater than the dimensions of the core,
   (b) said sleeve having sufficient heat shrinkability to grip tightly said core member upon being subjected to a heat-shrinking environment,
   (c) assembling said core concentrically within said sleeve,
   (d) locally heating the outer surface extremities only of the core by applying high frequency energy thereto,
   (e) said local heating of the core being sufficient to shrink down said sleeve and to effect melt bonding of the innermost surface extremities of said sleeve to said core,
   (f) cooling the exterior of said sleeve in the regions of the local heating of said core to confine melting of the sleeve to said innermost surface extremities,
   (g) said inner surfaces of said sleeve thereby being bonded to said core while under shrink stresses induced by the contraction of said sleeve about said core.

2. The method of covering a heat conductive processing roller or the like with heat-shrinkable fluorinated ethylene polymer tubing, which comprises
   (a) applying the heat-shrinkable tubing over the roller,
   (b) heating an axially restricted annular portion of the roller by high frequency energy applied through the tubing to concentrate heat at the interface of the roller and tubing,
   (c) maintaining the heat in a restricted annular portion of the roller at a level to radially heat shrink the tubing into tight conformity with the roller and to melt bond the tubing to the roller in the region of said annular portion while maintaining circumferential shrink stress in surrounding outer portions of the tubing,
   (d) said fluorinated ethylene polymer tubing being heated in said restricted annular portions to thermal degradation temperatures,
   (e) cooling the exterior of the tubing in the region of said restricted annular portion to confine melting of the tubing material to the inner surface extremities thereof, and
   (f) advancing said restricted annular portion from one end of the roller to the other to progressively shrink and melt bond the tubing to the roller.

3. The method of applying a tubular covering of heat shrinkable fluorinated ethylene polymer material to a cylindrical heat conductive roller, which includes the concentric application of the tubular covering over the roller, the application of heat to heat-shrink the tubular covering into a tight fitting relationship with the roller surface, and cooling the covered roller comprising
  (a) concentrating said heating at the outer surface extremities of the roller by application of high frequency energy through said sleeve to melt only the inner surface extremities of the tubular covering,
  (b) whereby a melt bond is formed between the inner surface of said tubular covering and the surface of the roller,
  (c) said melt bond being formed at temperatures tending to cause thermal degradation of the tubular covering material.

4. The method of covering a heat conductive process roller or the like with heat shrinkable tubing, which comprises
  (a) supplying a hollow tubular sleeve of heat shrinkable material having a greater inside diameter than the outside diameter of the process roller,
  (b) applying said tubular sleeve over the process roller,
  (c) heating the tubular sleeve to heat shrink it into tight conformity with the surface of said process roller,
  (d) melting the inner surface extremities of said tubular sleeve in contact with said roller surface by the application of high frequency radiant energy to said process roller through said sleeve to develop concentrated heat at the outer surface extremities of the process roller,
  (e) said concentrated heat being applied locally to an axially restricted annular portion of said roller and tubular sleeve,
  (f) said axially restricted annular portion being advanced from one end of the roller to the other to progressively shrink and melt bond the tubular sleeve onto the roller surface,
  (g) applying axial tension to said tubular sleeve during said heating step, and
  (h) cooling the exterior of the sleeve in the region of the axially restricted annular portion to confine the melting to the interior surface extremities of the tubular sleeve and to solidify the melted inner surface of said tubular seleve to form a melt bond between the sleeve and roller surface.

5. The method of claim 4, wherein
  (a) said tubular sleeve is fluorinated ethylene polymer material, and
  (b) said heating step is so conducted as to raise interior surface extremities of the sleeve to the thermal degradation temperature of said material.

6. The method of applying a release covering to a heat-conductive metallic core member, which comprises
  (a) covering the core member with fluorinated ethylene polymer material in film form,
  (b) progressively and locally applying to the core, in a concentrated annular region adjacent the interface of the core with the fluorinated ethylene polymer material, high frequency induction heating energy, to bring the fluorinated ethylene polymer material to a melt condition, at least at said interface, and
  (c) causing the fluorinated ethylene polymer material to be maintained under radial compression against the core member, at least while said material is in its melt condition.

7. The method of claim 6, further characterized by prior to said application of high frequency induction heating energy to said core member
  (a) first selecting a sleeve of tetrafluorinated ethylene polymer material and heating it above its gel temperature,
  (b) applying said tetrafluorinated ethylene polymer sleeve to said fluorinated ethylene polymer material covered core while in its heated condition with the fluorinated ethylene polymer material serving as a bonding agent between said tetrafluorinated ethylene polymer material and said core material, and
  (c) said tetrafluorinated ethylene polymer material cooling and thermally contracting onto said fluorinated ethylene polymer material for confining said fluorinated ethylene polymer material under pressure during the subsequent application of high frequency induction heating energy to said core member.

8. The method of claim 7, further characterized by
  (a) the fluorinated ethylene polymer material being brought to a melt condition locally by the progressive local application of concentrated high frequency induction heating while the sleeve of tetrafluorinated ethylene polymer remains at or above its gel temperature.

9. The method of claim 6, further characterized by
  (a) said fluorinated ethylene polymer material being over-wrapped with a dimensionally stable, high strength, over-wrap material,
  (b) said over-wrap material serving to confine the fluorinated ethylene polymer material under pressure while said material is in its melt condition,
  (c) said over-wrap material being subsequently removed to expose the fluorinated ethylene polymer.

10. The method of claim 9, further characterized by
(a) said overwrap material is a polyimide film, glass fabric or a combination thereof.

References Cited

UNITED STATES PATENTS

| | | | |
|---|---|---|---|
| 3,470,046 | 9/1969 | Verdin | 156—86 |
| 3,426,119 | 2/1969 | Chapman et al. | 156—86 |
| 3,315,348 | 4/1967 | Donovan et al. | 156—272 |
| 3,356,551 | 12/1967 | Glenn et al. | 156—333 |

WILLIAM D. MARTIN, Primary Examiner

J. H. NEWSOME, Assistant Examiner

U.S. Cl. X.R.

156—165, 272, 282, 306, 321, 333